United States Patent
Schwartz et al.

(10) Patent No.: US 9,378,476 B1
(45) Date of Patent: Jun. 28, 2016

(54) METHOD AND APPARATUS FOR REAL TIME AUTOMATED INTELLIGENT SELF-SCHEDULING

(71) Applicant: Workflex Solutions LLC, Cincinnati, OH (US)

(72) Inventors: Larry S. Schwartz, Cincinnati, OH (US); Mitesh D. Desai, Plano, TX (US)

(73) Assignee: WorkFlex Solutions LLC, Cincinnati, OH (US)

( * ) Notice: Subject to any disclaimer, the term of this patent is extended or adjusted under 35 U.S.C. 154(b) by 0 days.

(21) Appl. No.: 14/599,053

(22) Filed: Jan. 16, 2015

Related U.S. Application Data

(63) Continuation-in-part of application No. 14/170,782, filed on Feb. 3, 2014, now Pat. No. 9,280,754, which is a continuation-in-part of application No. 13/136,724, filed on Aug. 9, 2011.

(60) Provisional application No. 61/401,244, filed on Aug. 10, 2010.

(51) Int. Cl.
*G06Q 10/00* (2012.01)
*G06Q 10/06* (2012.01)

(52) U.S. Cl.
CPC ............................. *G06Q 10/063116* (2013.01)

(58) Field of Classification Search
CPC ................. G06Q 10/00–50/00; G06Q 90/00; G06Q 99/00; G06F 1/00; G06F 3/00; G06F 5/00; G06F 7/00–9/00; G06F 11/00–13/00; G06F 15/00; G06F 17/00; G06F 19/00; G06F 21/00
See application file for complete search history.

(56) References Cited

U.S. PATENT DOCUMENTS

| | | | |
|---|---|---|---|
| 5,907,829 A * | 5/1999 | Kida | 705/7.16 |
| 6,192,346 B1 * | 2/2001 | Green | G06Q 10/063116 705/7.16 |
| 6,301,573 B1 | 10/2001 | McIlwaine et al. | |
| 6,587,831 B1 * | 7/2003 | O'Brien | 705/7.16 |
| 6,628,777 B1 | 9/2003 | McIlwaine et al. | |
| 6,957,188 B1 * | 10/2005 | Dellevi et al. | 705/7.14 |
| 7,174,010 B2 * | 2/2007 | McIlwaine et al. | 379/265.01 |
| 7,499,869 B2 * | 3/2009 | Iknoian | 705/7.16 |
| 7,962,356 B2 * | 6/2011 | Bollenbeck et al. | 705/7.13 |
| 8,046,249 B2 | 10/2011 | Hitz | |
| 8,219,430 B1 * | 7/2012 | Thompson et al. | 705/7.12 |
| 8,781,873 B2 * | 7/2014 | Purohit et al. | 705/7.18 |
| 8,788,308 B1 * | 7/2014 | Cox et al. | 705/7.16 |
| 2003/0086555 A1 * | 5/2003 | McIlwaine et al. | 379/265.02 |
| 2004/0010437 A1 | 1/2004 | Kiran et al. | |
| 2005/0125278 A1 * | 6/2005 | Vajracharya et al. | 705/9 |
| 2005/0137925 A1 * | 6/2005 | Lakritz et al. | 705/8 |

(Continued)

OTHER PUBLICATIONS

US Office Action, Non-Final, dated Dec. 20, 2012 for U.S. Appl. No. 13/136,724.

(Continued)

*Primary Examiner* — Alan S Miller
(74) *Attorney, Agent, or Firm* — Frost Brown Todd LLC

(57) ABSTRACT

A business can use an improved workforce management system which includes capabilities for supporting intraday dynamic staffing. This dynamic staffing can include identifying wages which should be offered to workers to induce them to meet the business' needs, based on, for example, historical information stored in a database. Systems which include dynamic intraday staffing can be run using remote servers and interfaces accessed through various types of devices, such as internet enabled personal computers.

15 Claims, 9 Drawing Sheets

(56) References Cited

U.S. PATENT DOCUMENTS

| | | | |
|---|---|---|---|
| 2005/0175971 A1* | 8/2005 | Mcilwaine | G06Q 10/06 434/219 |
| 2005/0288987 A1* | 12/2005 | Sattler et al. | 705/9 |
| 2006/0109975 A1* | 5/2006 | Judkins et al. | 379/265.02 |
| 2007/0127689 A1* | 6/2007 | McIlwaine et al. | 379/265.02 |
| 2007/0179830 A1* | 8/2007 | Iknoian | 705/9 |
| 2007/0208604 A1* | 9/2007 | Purohit et al. | 705/9 |
| 2008/0059277 A1* | 3/2008 | Medina | G06Q 10/06 705/7.14 |
| 2008/0059278 A1* | 3/2008 | Medina | G06Q 10/06 705/7.14 |
| 2008/0075268 A1* | 3/2008 | Medina | H04M 3/5175 379/265.06 |
| 2009/0182611 A1* | 7/2009 | Iknoian | 705/9 |
| 2010/0017251 A1* | 1/2010 | Rawle et al. | 705/9 |

OTHER PUBLICATIONS

US Office Action, Final, dated Jun. 5, 2013 for U.S. Appl. No. 13/136,724.

US Office Action, Non-Final, dated Mar. 12, 2015 for U.S. Appl. No.13/136,724.

US Office Action, Non-Final, dated Apr. 24, 2014 for U.S. Appl. No. 14/170,782.

US Office Action, Non-Final, dated Oct. 29, 2014 for U.S. Appl. No. 14/170,782.

US Office Action, Non-Final, dated May 14, 2015 for U.S. Appl. No. 14/170,782.

U.S. Office Action, Final, dated Sep. 3, 2015 for U.S. Appl. No. 14/170,782.

* cited by examiner

Figure 4

CALCULATED AGENT DEMAND

| | | Revenue Impact | OI Impact |
|---|---|---|---|
| Tech Support | 20 | 2,800.00 | 700.00 |
| Customer Service | 10 | 1,200.00 | 300.00 |
| Sales | 15 | 1,500.00 | 500.00 |

CALCULATED FLEXIBLE WAGE

| | | | Maximum Calculated Rate | | | | |
|---|---|---|---|---|---|---|---|
| | Breakeven Rate | Breakeven Threshold | Basepay | Callout History | Offered Rate | Recovered OI($) | Recovered OI(%) |
| Tech Support | $33.75/hr | $33.00/hr | $45.00/hr | $33.00/hr | $33.00/hr | 460.00 | 66% |
| Customer Service | $30.50/hr | $27.60/hr | $37.50/hr | $27.50/hr | $27.50/hr | 200.00 | 67% |
| Sales | $28.33/hr | $22.52/hr | $30.00/hr | $22.00/hr | $22.00/hr | 380.00 | 76% |

AGENT CALLOUT LIST

| Client/Program | First Name, Last Name | Contact Phone | Contact Mail | Proficiency (%) | Success Ratio (%) | # of Times Called |
|---|---|---|---|---|---|---|
| Tech Support | Carly Smith | 222-555-1414 | carlysmith@test.com | 95 | 75 | 4 |
| Tech Support | Bharat Patel | 222-555-2323 | bharatpatel@test.com | 92 | 100 | 2 |
| Tech Support | Dale Hansen | 222-555-3232 | dalehansen@test.com | 91 | 100 | 0 |
| Tech Support | Lisa Riley | 222-555-1882 | lriley@test.com | 90 | 75 | 4 |
| Tech Support | Darren McKnight | 222-555-4848 | darrenmcknight@test.com | 90 | 50 | 2 |
| Tech Support | Cat Stevens | 222-555-2020 | catstevens@test.com | 85 | 67 | 3 |

METHOD AND APPARATUS FOR REAL TIME AUTOMATED INTELLIGENT SELF-SCHEDULING

CROSS REFERENCE TO RELATED APPLICATIONS

This application claims priority from, and is a continuation in part of, U.S. non-provisional patent application Ser. No. 14/170,782, filed Feb. 3, 2014, which itself claims priority from, and is a continuation in part of, U.S. non-provisional patent application Ser. No. 13/136,724, filed Aug. 9, 2011, which itself claims priority from, and is a non-provisional of, U.S. Provisional Patent Application Ser. No. 61/401,244, which was filed on Aug. 10, 2010, each of which are hereby incorporated in their entirety by reference for all purposes.

BACKGROUND

To schedule large hourly workforces (for example call center agents), most companies utilize Workforce Management (WFM) software-based products that provide forecasting and scheduling capability. The forecasting capabilities typically utilize analytics against historical patterns of demand to predict future demand. An example of a typical WFM system architecture is shown in FIG. 1.

However, WFM systems have a limited ability to deal with situations where the actual demand or supply of agents differs from what has been forecast. For example, if the WFM system forecasts a demand of 200 agents for a given day, and schedules 200 agents accordingly, but the actual demand is 225 agents and only 175 show up to work, the system can do little to enable the company to adjust for the unexpected gap of 50 for that day, beyond offer reporting tools to track staffing level gaps.

Additionally, the processes used to change schedules by entities using traditional WFM systems are generally inefficient and can lead to sub-optimal results. For example, when an agent wants to have his or her schedule changed, he or she will generally be required to contact an administrator (or other individual with authority to make the change) and make a request. The administrator will then consider the agent's schedule and other factors that may be relevant in a given situation and decide whether to approve or deny the change. At best, this type of process will result in additional work for the administrator and wasted time and frustration for anyone waiting to learn if the request is approved or denied. Additionally, it will often result in a sub-optimal scheduling decision being made, since the administrator may not have all relevant data easily available when determining whether to approve the request and, even if all relevant data is easily available, may not have the time to do a complete analysis.

Accordingly, there is a need in the art for improved workforce management technology to deal with intraday staffing gaps and employee initiated change requests.

SUMMARY

The technology disclosed herein can be used for a variety of purposes, including addressing the lack of ability in current WFM products to adjust for intraday staffing gaps and divergences between actual demand during a shift and the demand projected when the schedule for that shift was created. This can be achieved, for example, by an intraday staffing system that dynamically generates an optimized agent callout list and wage offer based on business rules that have been preconfigured by the company. The disclosed technology can also be used to facilitate the submission and processing of requests for schedule changes, such as through a computer configured to generate a scheduling interface with information on potential changes, and to automatically approve or deny some or all of the changes requested through such an interface. Of course, as will be apparent to those of ordinary skill in the art in light of this disclosure, the disclosed technology is susceptible of other implementations, and so the example described above should be understood as being illustrative only, and not limiting.

BRIEF DESCRIPTION OF THE DRAWINGS

The drawings and detailed description which follow are intended to be merely illustrative and are not intended to limit the scope of the invention as contemplated by the inventors.

FIG. 4 depicts an exemplary input screen.

FIG. 5 depicts an exemplary output screen.

FIG. 8 depicts an interface which could be used to support worker initiated schedule changes.

FIG. 9 depicts an interface which a worker could use to fill in his or her work schedule.

DETAILED DESCRIPTION

Figure 1:
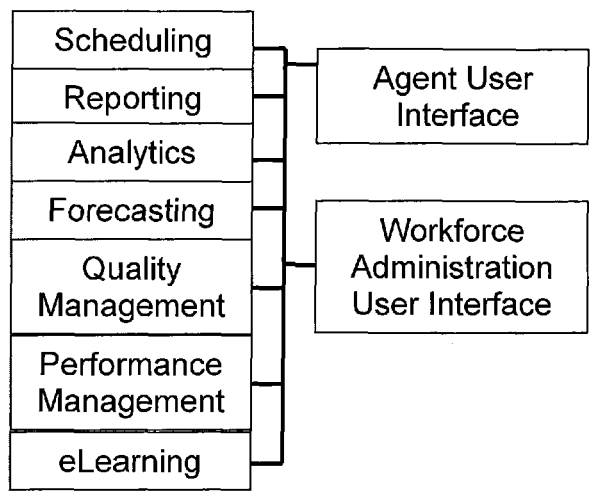
FIG. 1 depicts a typical WFM system architecture.
Figure 2:
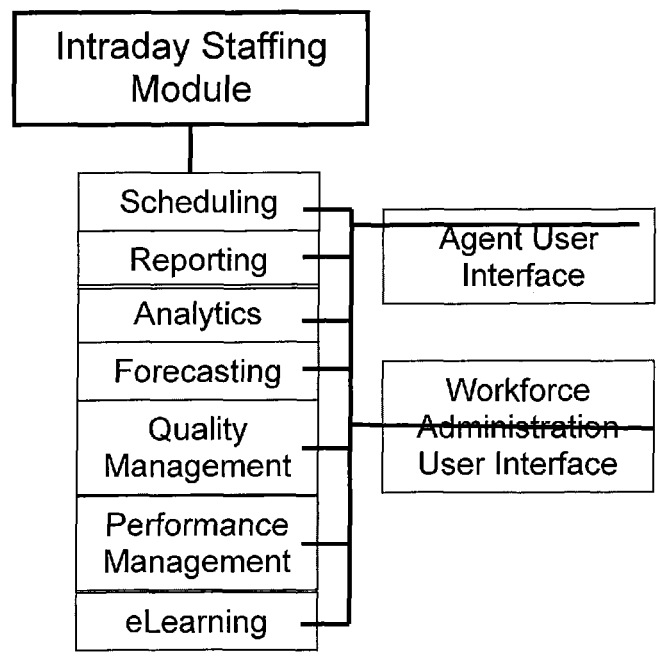
FIG. 2 depicts an exemplary high level enhanced WFM system architecture with intraday staffing engine.
Figure 7:
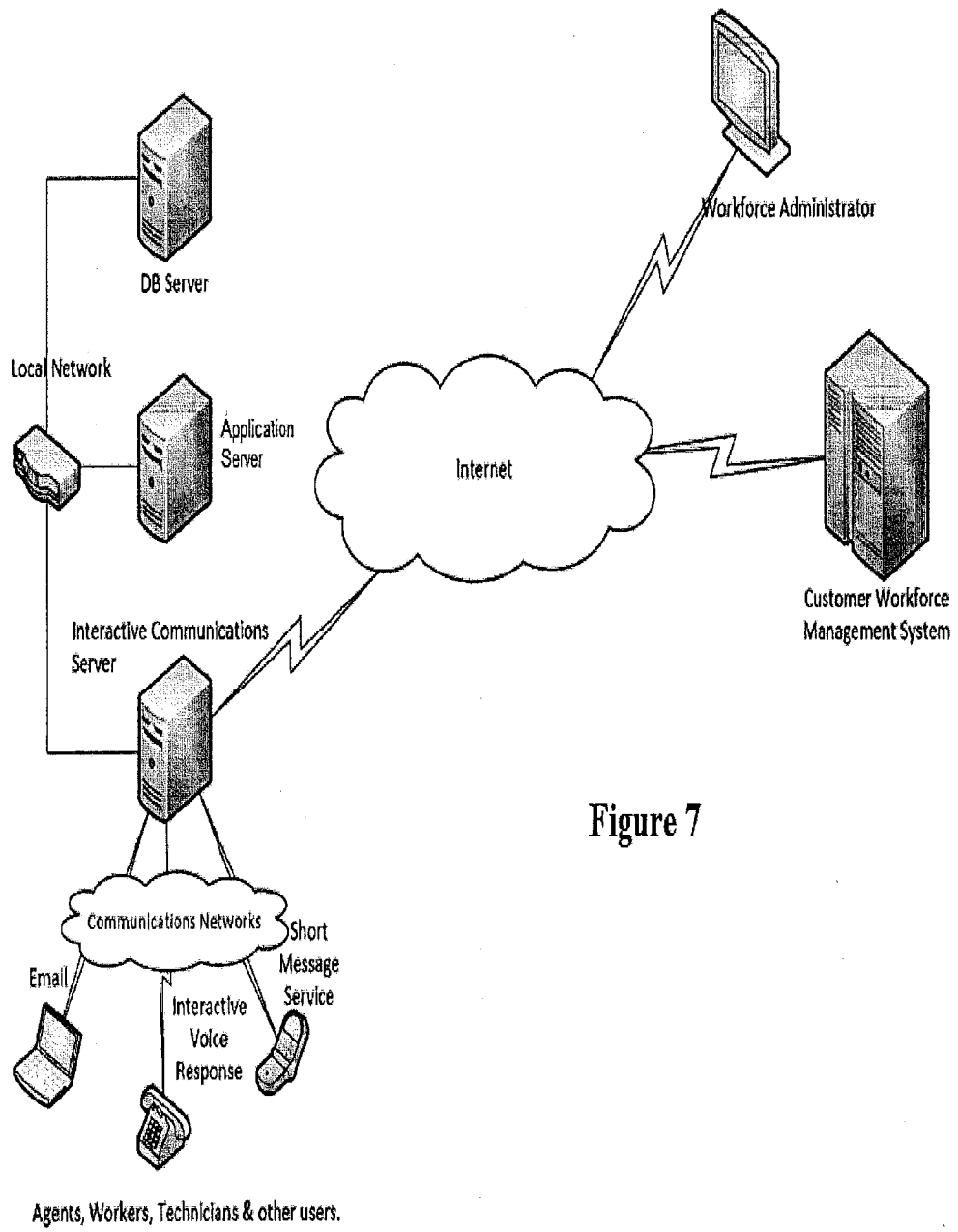
FIG. 7 depicts exemplary components which could be used in implementing the technology described herein.

Turning first to the figures, FIG. 2 depicts an exemplary high level enhanced WFM system architecture. As can be seen by comparison with the architecture shown in FIG. 1, the enhanced architecture differs from that typically available by the addition of an intraday staffing engine. Of course, it should be understood that the high level diagram of FIG. 2 is formatted for easy comparison with the typical architecture of FIG. 1, and that actual implementations would not necessarily share the structure shown in FIG. 2. As an example of this, consider the exemplary system architecture of FIG. 3, which provides an alternate approach to implementing the technology described herein. As will be apparent to one of ordinary skill in the art, such an architecture could be used with exemplary components such as shown in FIG. 7 to implement dynamic intraday scheduling.

Figure 3:
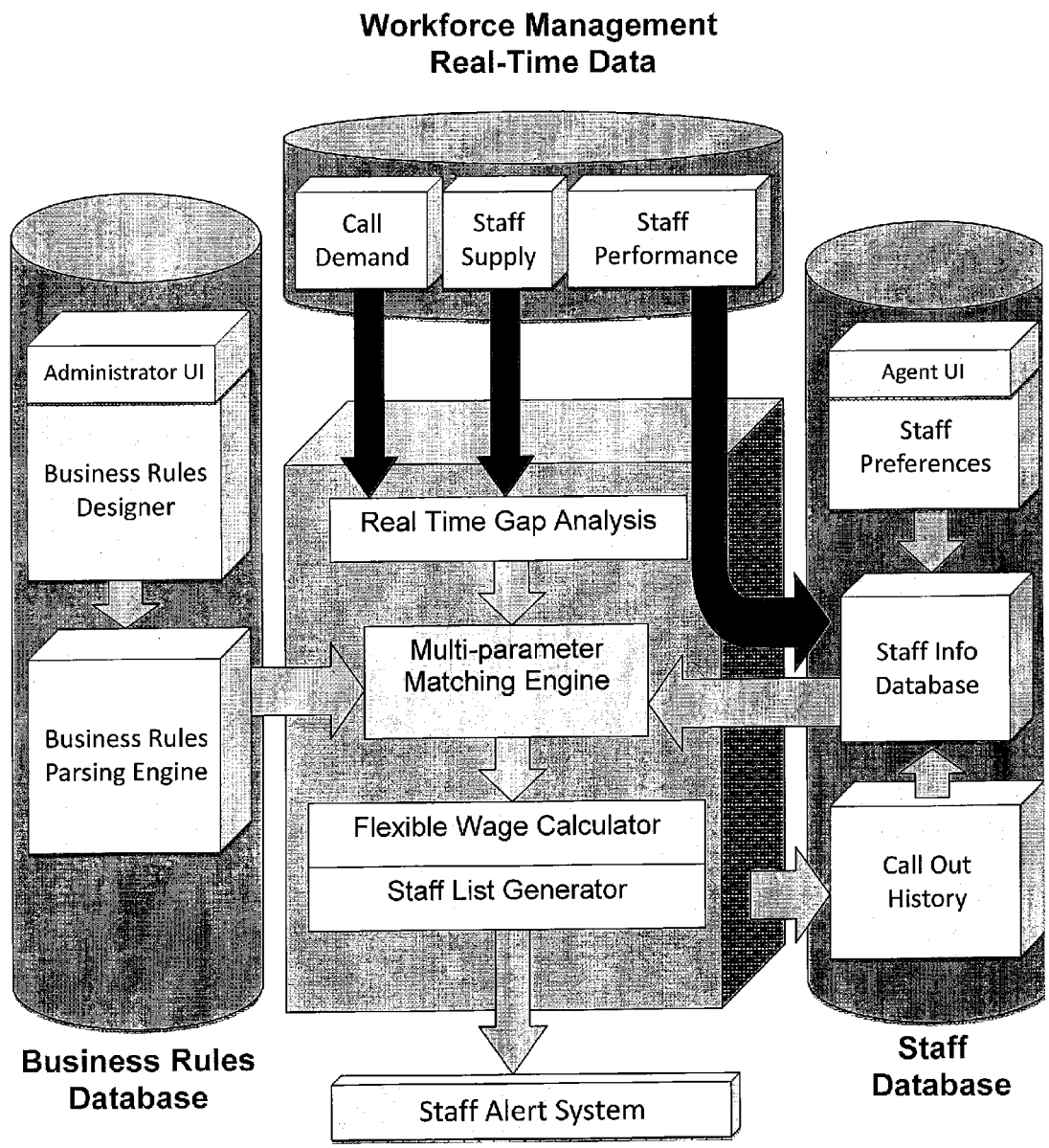
FIG. 3 depicts an exemplary system architecture which could be implemented using the disclosed technology.

As shown in the architecture of FIG. 3, the technology described herein could be used to implement in a system in which the heart of the system is a multi-parameter matching engine capable of processing and integrating feeds from a variety of sources. Such sources can include, for example:

Workforce Management Real-Time Data including Real Time Call Demand, Agent Supply, and Agent Performance information which can typically be extracted from the existing WFM system or telecom interface (e.g., PBX, ACD);

Business Rules Database that includes a business rules designer and business rules parsing engine that supports the aggregation of multiple predefined business rules; and Staff Database which contains staff specific information such as staff availability preferences, performance data and call out history (i.e., the acceptance rate of offers previously provided).

In some implementations, such a multi-parameter matching engine can use the real-time workforce management data to identify a staffing gap. It could then match this against rules that have been defined within the business rules database to determine what actions need to be taken (e.g., selection criteria for agents, and time-urgency of staffing needs) which would then be matched against the agent database to generate an optimized staff call out list and dynamic wage offer based on the criteria defined by the business rules database. This information could then be used by a staff alert system (e.g., email, voice-mail, mobile messaging) to contact the individuals and provide an offer to come for a previously unscheduled shift.

This allows dynamic calculation of a dynamic wage offering for intraday staffing, which is a functionality not previously known or available in the prior art. As an example, if the business rules database determines a time-urgency that requires 80% of offers to be accepted, the system will analyze previous acceptance rates at various staffing levels and generate a recommended wage level that has typically resulted in an 80% acceptance rate.

Figure 4:
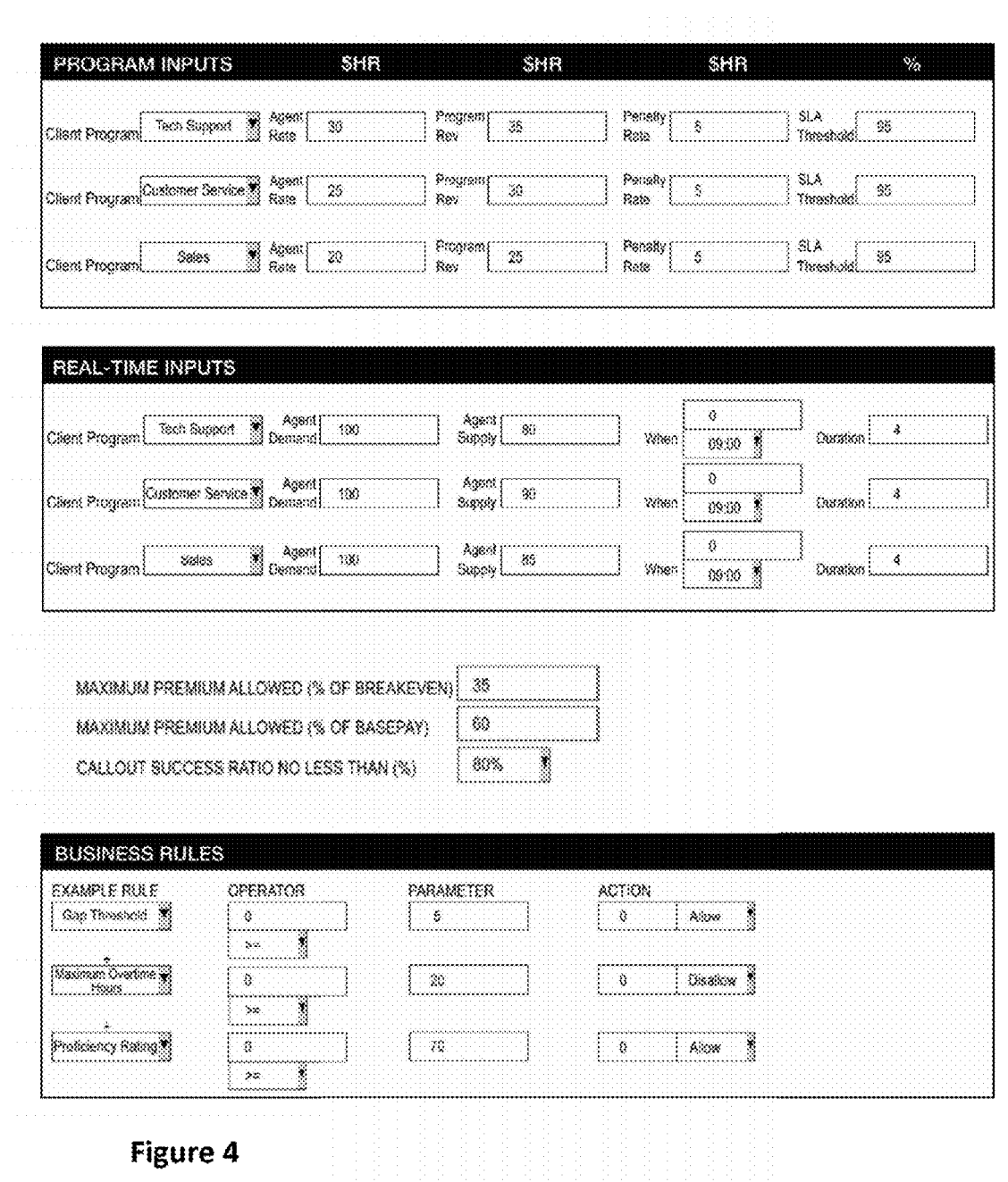

To illustrate how a system with an architecture such as shown in FIG. 3 could be used in practice, consider an implementation in which a back end system having an architecture such as shown in FIG. 3 is used to power a web accessible input screen such as shown in FIG. 4. In such interfaces, there could be a program input portion which enables input of information for various programs being supported, such as, in the case of FIG. 4, customer care, technical support and sales. For each program, information of the cost and revenue for each program can be input, including any internal performance compliance requirements and/or contractual service level agreements that may be in place. There could also be a real time input section, which could be provided by an existing workforce management system and could provide details on staff supply and demand for a particular time window. This part of the screen could also allow operators to specify the maximum staff wage premiums (or other types of incentives, such as paid time off or preferential treatment for future schedule modifications) they are willing to offer and the success rate they wish to achieve for "call outs". The system can be designed to use historical success rates and wages to dynamically calculate the wage (or other incentive) to be offered what will achieve the desired success rate. There could also be a business rules section which could allow users to create rules on how they would like to respond to various situations. An example of a rule might be to trigger a search for on call staff if the gap is greater than 5 and then to look for available staff with a proficiency rating of 70/100 or better, excluding staff that have worked over 20 overtime hours that week already.

Of course, it should be understood that the interface of FIG. 4, and the associated description, are both intended to be illustrative only, and should not be treated as limiting on the potential scope of any claims included in this or any related document. For example, in some implementations, rather than having various portions included in a single interface screen, a back end system could be used to power multiple screens, each of which would be dedicated to a particular type of input. Further, in some implementations, there might be screens in addition to, or as alternatives to, those illustrated in FIG. 4. As an example, consider the exemplary output screen illustrated in FIG. 5.

In some implementations, when a system detects a status that requires action based on the business rules (e.g., as defined in an input screen such as shown in FIG. 4), an alert can be set to a staffing information module with information such as:

A calculated agent demand, which can be presented in a section of a screen which shows the identified staffing gaps and potential revenue and operating income exposure based on information that has been provided to the system (e.g., on the input screen);

A flexible wage section, which can be presented in a section of a screen which shows any recommended variance to the standard base wage level based on rules provided on the input screen (e.g., call out success rate required); and An agent call out list, which can include names of individuals the system is recommending calling based on the business rules defined on the input screen (e.g., proficiency, previous call out success, overtime hours . . . ), and may also include how the system will contact them (e.g., SMS, voicemail, email).

In a production environment, an administrator could approve a system recommendation (e.g., as shown in a screen such as FIG. 5), or the system could be configured to proceed with a recommended course of action automatically. In either case, this would result in the system automatically calling out to the staff on the list (through email, voice mail or short message) and providing an offer to work at the dynamically calculated wage rate.

Figure 6:
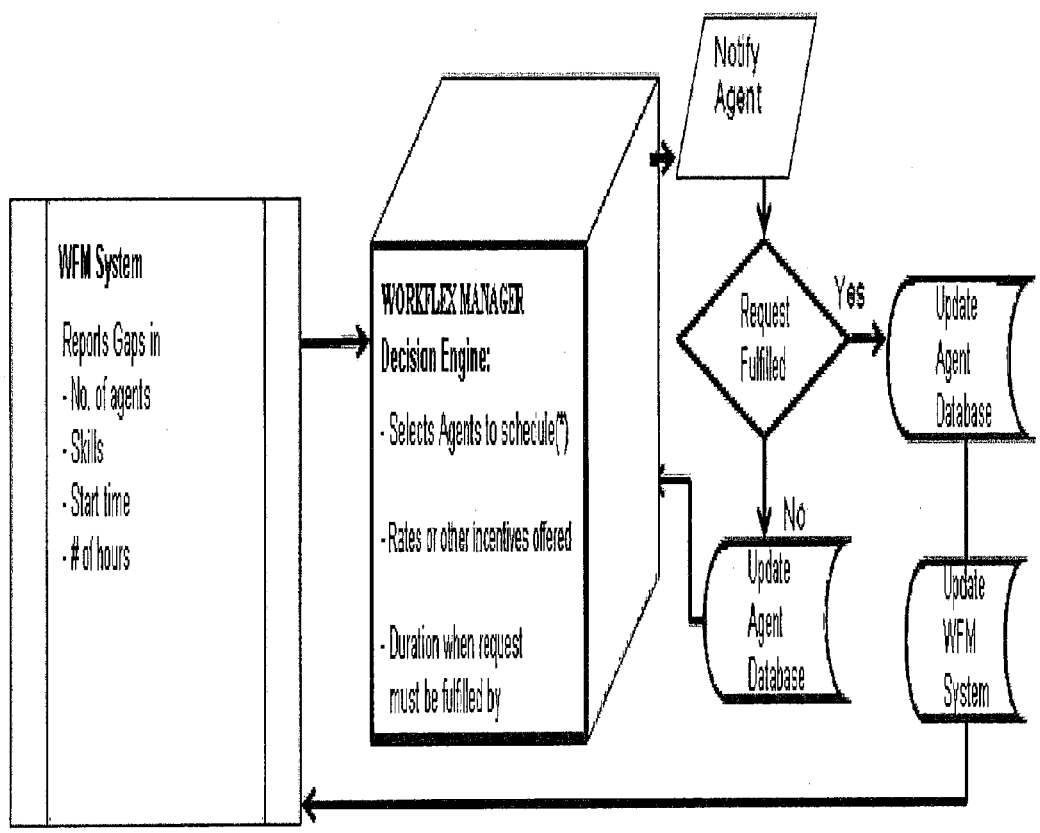
FIG. 6 depicts an exemplary process flow.

FIG. 6 illustrates a process flow (which could be either administrator initiated or self-schedule) which could be implemented using the disclosed technology. The technology disclosed herein, when used in support of process flows as shown in FIG. 6 or otherwise, can be implemented to provide a number of beneficial features (one or more of which may be present in various embodiments), including:

The ability to predefine business rules for intraday staffing;
The ability to calculate optimum wage offers to achieve desired acceptance rate;
The ability for the system to automatically act (e.g., by calling out agents) when a trigger for action is detected;
The ability for agents to self-schedule (e.g., initiating a request) and get a response including a dynamic wage offer; and
The ability to make a dynamic wage offer based on business rules and historic success rate data.

As will be immediately apparent to one of ordinary skill in the art, the disclosed technology could be beneficially employed in a broad variety of scenarios, and would be particularly useful in business environments having one or more of the following attributes:
1) Large workforce with common assignment types
2) Variations in demand that are not always predictable
3) Variations in workforce supply that are not always predictable
4) Business sensitivity to intraday gas between workforce supply and demand.
5) Compliance Factors (e.g., labor agreement, overtime rules, seniority guidelines . . . )

Such environments include:
Contact Center Agents (either in-house our outsourced), which is generally characterized by a large hourly workforce, with forecasting capability generally no better that +/−10%. In this application, common business rules attributes could include Agent Proficiency, Overtime Hours Worked, On Call Availability, Time Zone, and Base Wage Rate.
Tech Service Dispatch (e.g., Cable, Telephone, Electric, Heating, Plumbing . . . ) In this application, common business rules attributes could include technical certification, seniority, overtime hours worked, on call availability and proximity to job site.

Health Care Workers (e.g., RN's, Emergency Room staff, Support Staff). In this application, common business rule attributes could include overtime hours worked, on-call availability, and proximity to work site.

Restaurant/Hotel/Hospitality (e.g., Service, Kitchen, Maintenance Staff). This application segment could include a single location (e.g., Large hotel), or multiple locations e.g., fast food chain). In this application, common business rules attributes could include overtime hours worked, on call availability and proximity to job site.

Of course, it should be understood that, while the disclosure set forth above focused primarily on addressing intra-day staffing gaps through the automatic generation of a call out list of agents to whom dynamic wage offers should be sent, the inventors' technology can also be used to provide other incentives in response to detecting other types of staffing gaps. For example, the inventors' technology could be used to implement a system which could allow a user to define business rules specifying other types of responses to detected staffing gaps—such as sending requests that individuals who have been assigned to work during a shift agree to cancel the shift, or to come in late, as a way of addressing a situation during which an updated projection indicates that the actual demand during a shift is likely to be less than was expected at the time the work assignments for that shift were made. Other types of responses (e.g., requesting workers to extend their hours, requesting workers to work on training instead of their normal work responsibilities, etc.) could also be supported using the disclosed technology, and so the discussion of dynamically determining intra-day wage offers should be understood as being illustrative only, and should not be treated as limiting.

Additionally, just as the disclosed technology could be used to support other types of responses than dynamic wage offers and to deal with other types of staffing gaps than those created when actual demand exceeds that which was projected at the time of schedule creation, the disclosed technology could also be used to support different types of workflows than the administrator or system triggered workflows described in the context of dynamic wage offers. To illustrate, consider FIG. 8, which shows an interface which could be used to support worker initiated schedule changes. In that figure, a calendar [801] is displayed, indicating time slots during which a worker is scheduled to work and which could not be removed from his or her schedule, which time slots during which the worker is scheduled to work which could potentially be removed from his or her schedule, and which slots during which the worker was not currently scheduled to work which could potentially be added to the worker's schedule. Such an interface could not only provide information on which slots were potentially subject to change, but could also allow a user to make those changes, such as by dragging and dropping work hours from a slot which could potentially be removed from the workers schedule to a slot which could potentially be added to a worker's schedule; by selecting a slot which could be added to a worker's schedule and a slot which could be removed from a worker's schedule, then activating an exchange button; or in some other manner. In this way, the worker would know which schedule changes were possible and could make them himself or herself, rather than being forced to guess what changes were permissible and waiting for approval from a manager before the change would actually be made.

Figure 8:
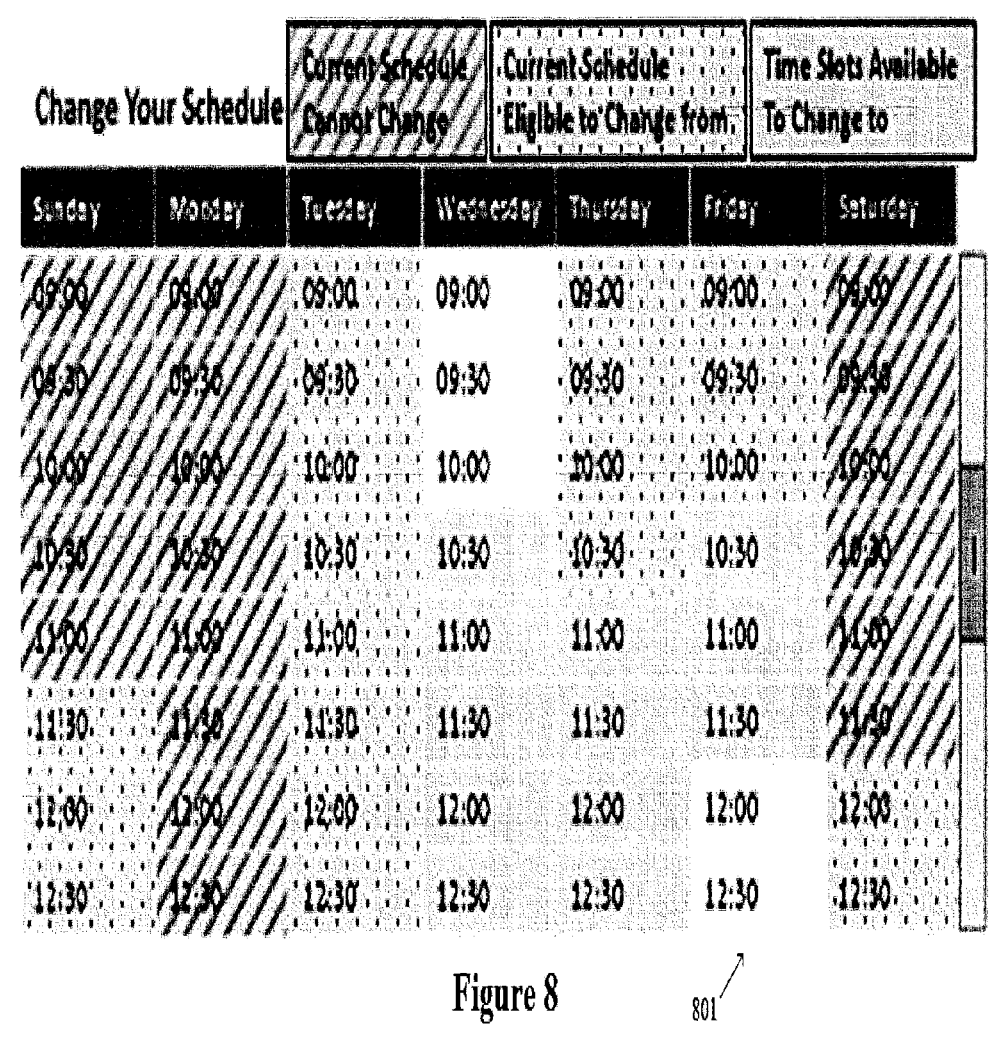

In an interface such as shown in FIG. 8, the determination of which slots should be included in which class (e.g., potential to be added to schedule, potential to be removed from schedule, required to remain on schedule and, though not shown in FIG. 8, required to remain off the schedule) could, like requests to take action to address a staffing gap, be made on a personalized basis for individual workers. To illustrate, consider the situation where an updated demand projection indicated that demand for Spanish speaking agents would be higher than expected from 8:00 pm to 10:00 pm, but lower than expected between 4:00 pm and 6:00 pm. In this situation, if a worker who had the ability to speak Spanish and was scheduled to work between 4:00 pm and 6:00 pm but not between 8:00 pm and 10:00 pm requested access to a schedule change interface (e.g., through an internal website which would require the worker to identify and validate himself or herself before being granted access), then the system could present that worker with a version of the interface of FIG. 8 which indicated that the slot between 4:00 pm and 6:00 pm could be removed from the worker's schedule, and that the slot between 8:00 pm and 10:00 pm could be added to the worker's schedule. By contrast, if a worker with a similar schedule but different skills wished to make a change, he or she could be provided with a version of the interface of FIG. 8 which would not indicate that an exchange of the 4:00-6:00 slot for the 8:00-10:00 slot was possible (or allow such a change to be made if the worker requested it nevertheless).

Figure 9:
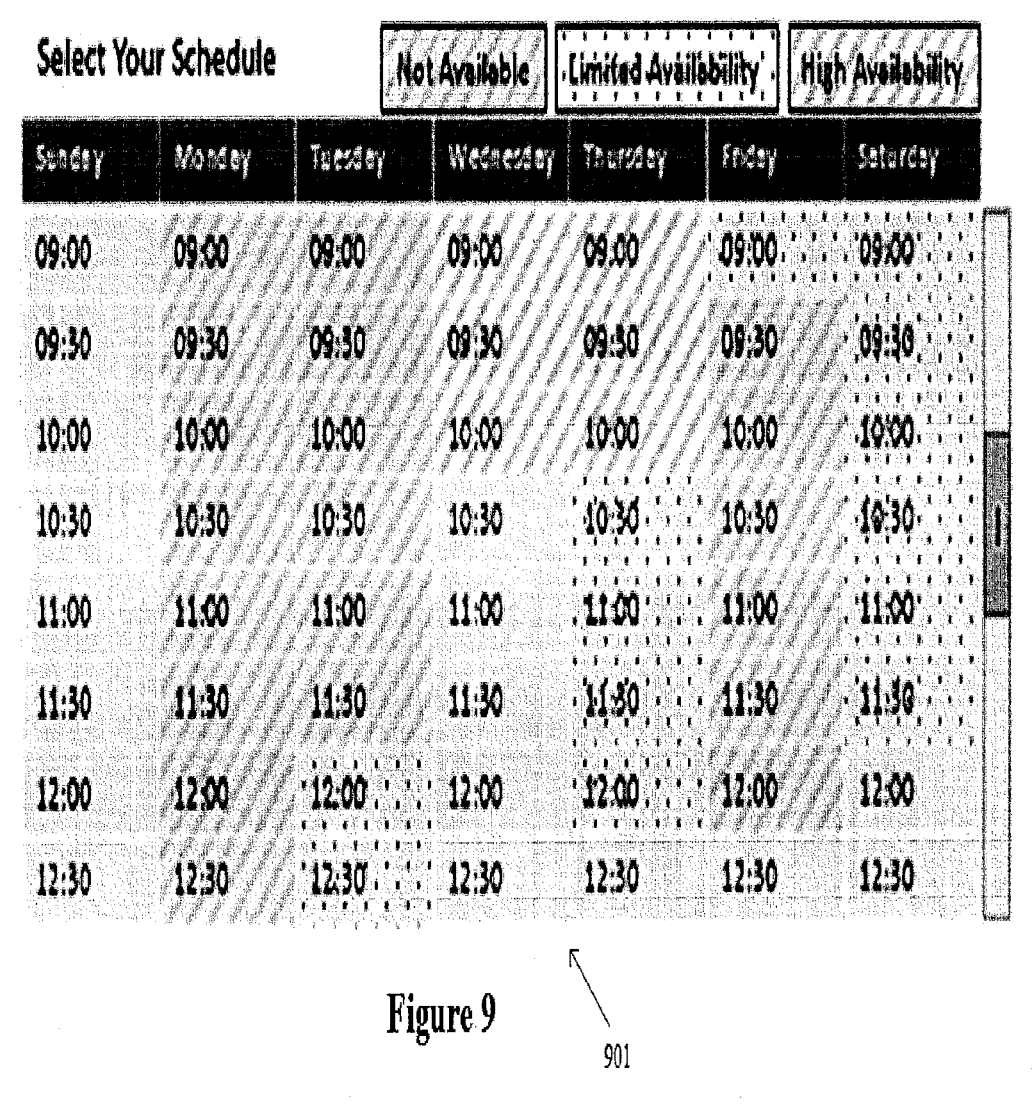

A self-scheduling approach such as described in the context of FIG. 8 could be used to allow workers to make schedule modifications other than just exchanging scheduled for unscheduled times. To illustrate, consider FIG. 9, which depicts an interface which a worker could use to fill in his or her work schedule. In that figure, a partial schedule calendar [901] is depicted showing slots which a worker is already scheduled to work (e.g., Wednesday at 12:00), and which slots a worker is not scheduled to work, with slots the worker is not scheduled to work depicted differently depending on whether they are available to be added to the worker's schedule. Using this type of interface, it is possible that a worker could have part of their schedule filled in using conventional methods (e.g., 20 hours out of a 40 hour week being pre-scheduled based on projections from a workforce management system) but given the freedom to fill in the remainder of their schedule in the manner which is most convenient for them by selecting the available slots from the interface of FIG. 9. Additionally, as shown in FIG. 9, to facilitate this type of schedule completion, a worker could be provided with information on relative availability of different slots, which relative availability information could translate into restrictions on the ability of the worker to select slots to fill in his or her schedule. For example, it is possible that, while the worker could be allowed to add as many high availability slots as he or she desires (up to the number of hours he or she had been allocated) he or she could be prevented from, or required to get managerial approval for, adding more than a threshold amount of limited availability slots during the period being scheduled.

Additionally, just as business rules and related business information (e.g., updated demand information, worker information from a staff database, urgency and other thresholds as defined by a business user, etc) could be used to generate personalized versions of interfaces as shown in FIGS. 8 and 9, it is possible that similar information could be used to update those interfaces after they have initially been generated. To illustrate, consider the example of a call center worker who is using an interface such as shown in FIG. 9 to complete his or her schedule. In this case, the interface presented to the call center worker could initially indicate that Thursday at 10:00 am is a high availability slot. However, it is possible that, after the interface is presented to the worker, a sufficient number of other call center workers with similar skills could add the Thursday 10:00 am slot to their schedules to push the difference between the scheduled demand for that slot and the number of workers scheduled for that slot below the threshold separating high availability slots from limited availability slots. In such a case, a message could be pushed to the device the user was using to view the interface of FIG. 9 which updates that interface to show that the Thursday 10:00 am slot had transitioned from high to limited or no availability.

Where this type of updating is supported, it could be implemented in a variety of ways. For example, a system using the disclosed technology could be implemented to periodically (e.g., every 15 minutes) review information such as changes in employee scheduling and demand projections for a workforce management system, and to push updates to interfaces such as shown in FIGS. 8 and 9 as necessary based on how that information had changed since the interface was generated or last updated. Similarly, it is possible that updates could be made in real time, to avoid a situation in which there is a time lag between an actual change in availability and when such a change would be propagated to interfaces such as shown in FIGS. 8 and 9. It is also possible to address issues related to time lags related to availability changes in ways other than real time updating. For example, when a user requests an interface such as shown in FIGS. 8 and 9, the request could be treated as a request for permission to access a database with both read and write permissions, and handled with the types of concurrency controls (e.g. locking of records) such as are commonly used in existing multi-user databases. Of course, just as personalization can be driven by business rules and related data, a similar approach could be used to control updating. For example, a user could define business rules which would cause an update to be pushed to user devices when a change of sufficient magnitude had taken place since the last update, or periodically on a schedule if no such changes had taken place. Accordingly, the specific updating approaches described above in the context of FIGS. 8 and 9 should be understood as being illustrative only, and should not be treated as implying limitations on the scope of protection provided by this document or any related document.

Similarly, just as variations are possible in how interfaces such as shown in FIGS. 8 and 9 can be updated, variations are also possible on the basic information presented through, and the schedule changes which can be made through, self scheduling interfaces implemented using the disclosed technology. As an example of this type of variation, consider availability data such as shown in FIG. 8. While splitting slots which can be used in schedule changes into those which are available for a change and those which are not such as shown in FIG. 8 could allow a user to identify and initiate schedule changes, it is also possible that, rather than splitting slots into broad categories of "available" and "not available", the disclosed technology could also provide more fine grained information (potentially including actual discrepancies between demand projections and scheduled workers). This provision of more fine grained information could, in turn, allow a worker more flexibility in creating or modifying his or her schedule. For example, rather than only permitting a worker to remove a slot from his or her schedule if the need for labor in that slot was lower than the need for labor in all slots which could be added to the worker's schedule, it is possible that a worker could be allowed to remove any slot from his or her schedule as long as he or she replaced it with a slot with a higher relative need for labor. Of course, variations on this general theme, such as only allowing changes between slots having a relative need differential greater than a threshold amount, or providing a larger number of availability categories than simply "available" or "not available" and allowing removal of any slot as long as it was replaced with a slot from an availability category representing a higher labor need, are also possible, and could be implemented without undue experimentation by those of ordinary skill based on this disclosure.

It is also possible that employee initiated schedule changes such as discussed in the context of FIGS. 8 and 9 could be modified by combining them with other concepts described in the context of employer initiated intra-day schedule changes. For example, just as the disclosed technology can be used to increase the likelihood of success for employer initiated intra-day schedule changes via incentives in personalized offers, it is possible that similar incentives could be provided via interfaces such as shown in FIGS. 8 and 9 to induce workers make changes adding slots with relatively higher labor needs to their schedules. For instance, rules could be created which would provide workers with some kind of reward (e.g., paid time off, a wage bonus, etc) if they make a threshold number of schedule changes in a given period, or if they make schedule changes which collectively reduce the differential between labor need and labor allocation by at least a threshold amount. Where such inducements are provided, interfaces such as shown in FIGS. 8 and 9 could be modified to indicate the availability and/or requirements for such inducements.

Similarly, self-scheduling interfaces such as shown in FIGS. 8 and 9 could also be integrated with implementations in which personalized offers are provided only to workers (or potential workers) included in a dynamically created optimized call out list. For example, when an optimized call out list is created in response to identifying a staffing gap, it is possible that a message could be pushed to the workers on that call out list informing them of an available reward, and indicating that they should access the schedule change interface in order to make the schedule changes necessary to obtain that reward. In this manner, it is possible that both employer and employee instigated schedule changes could be driven through a single interface, thereby reducing the difficulty (and increasing the likelihood of) beneficial schedule changes being made.

Of course, it should be understood that, while the description of scheduling in the context of FIGS. 8 and 9 focused primarily on examples in which workers would know in advance what changes to their schedules would be approved, self-scheduling could also be implemented through workflows in which additional analysis might be necessary for some (or all) requested changes. For example, in a case where there could be changes in slot availability between the time an interface is presented to a worker and the time a worker makes a request for a schedule change (e.g., where a self-scheduling interface is updated on a periodic basis), it is possible that slots could be categorized according to the likelihood that staffing gaps associated with those slots would be resolved between updates. In such a case, if a worker requested a schedule change involving a slot associated with a staffing gap with a likelihood of being resolved between updates which was greater than a threshold level, then before that change would be made, a further check (which could be automated or manual) could be made to ensure that the staffing gap had not been resolved, and the request could be denied (and the worker could be informed of such denial) if the staffing gap no longer existed at the time the request for a change was made. Similarly, rules could be created which would require that, before some changes (e.g., those between slots having needs which were relatively similar, or which had staffing gaps with absolute magnitudes below a user defined thresholds) could be made, they would have to be submitted to a human reviewer for approval.

Similarly, as will be immediately apparent to one of ordinary skill in the art in light of the above disclosure, using interfaces such as shown in FIGS. 8 and 9 is not a requirement for implementing self-scheduling techniques such as described above. To further illustrate the potential variety of interfaces which could be used for self-scheduling, consider FIG. 10, which depicts an alternative interface which could be used to allow staff members to change the tasks they would perform during scheduled slots. Using the interface of FIG. 10, a staff member could be allowed to change the type of work he or she would perform during the illustrated slots from the type of work which is assigned at the time the interface is generated to a preferred type of activity which is available for the relevant slot. For example, if a user to whom the interface of FIG. 10 has been presented wishes to change the work to be performed during the 6:00-6:30 am slot [1001] from a default assignment (e.g., providing phone support to incoming callers) to a preferred alternative assignment (e.g., ASA 101 online training [1002]), he or she could do so by simply swiping the preferred alternative assignment into its adjacent scheduled slot.

Figure 10:
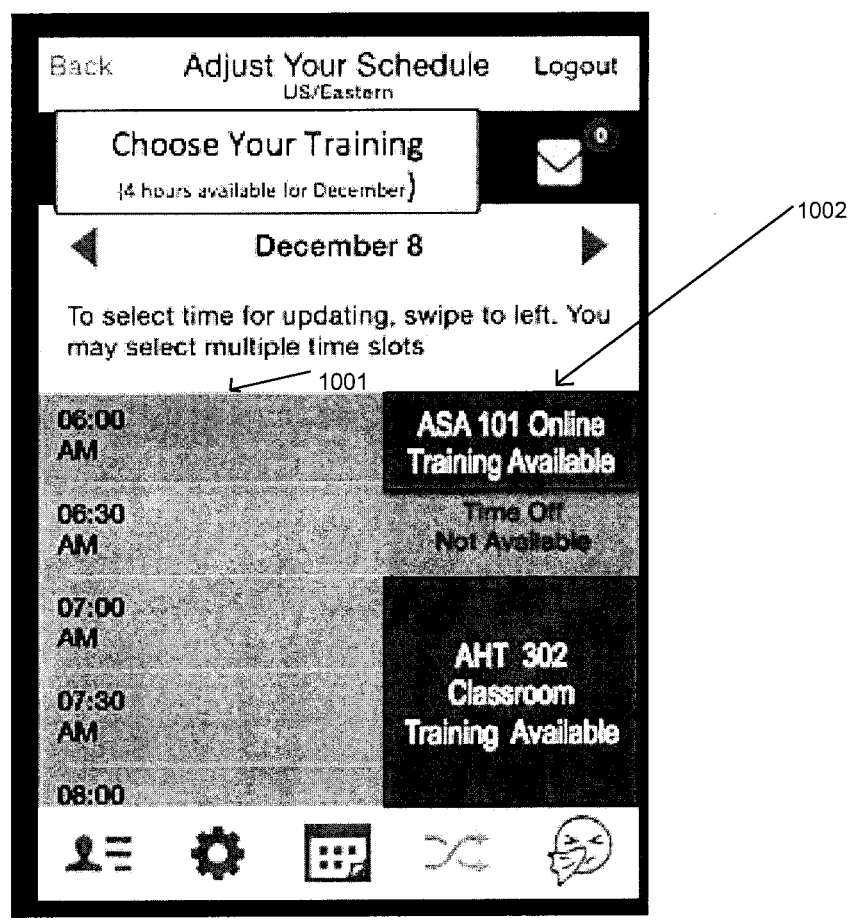
FIG. 10 depicts an interface which could be used to support worker initiated schedule changes.

An interface such as shown in FIG. 10 could be accessed in a manner similar to that described for the interfaces of FIGS. 8 and 9. For example, in some implementations, after logging into an internal website, a user could be presented with an interface such as illustrated in FIG. 10, rather than an interface such as those illustrated in FIGS. 8 and 9. This could be done, for example, based on the user's preferences (e.g., if the user had specified that he or she prefers to be provided with a particular type of interface), based on the device the user is using (e.g., the server hosting the internal website could detect the type of device being used, and provide an interface such as illustrated in FIGS. 8 and 9 to devices with larger displays (e.g., desktop computers) or an interface such as shown in FIG. 10 to devices with smaller displays (e.g., smartphones)), and/or based on other factors (e.g., the server hosting the website could be configured to recognize requests from internal IP addresses, and respond to those requests with an interface such as shown in FIG. 8, but to respond to other requests with whatever type of interface the user has indicated that he or she prefers).

Of course, it is also possible that the disclosed technology could be implemented in a manner which would provide different ways for different types of interfaces to be accessed, or which would not make multiple types of interfaces accessible. For example, the disclosed technology could be implemented in a system where customized apps would be used to configure staff member smartphones to obtain schedule data from a remote server and use it to populate a pre-determined type of interface (e.g., an interface as shown in FIG. 10). In this type of implementation, it may be possible to obtain access to other interfaces through other channels (e.g., via an internal website), or the schedule modification interface provided via the smartphone app might be the only one available. Similarly, it is possible that the disclosed technology could be implemented to initially provide one type of interface, but would also provide a tool for the user (e.g., a button or other type of control) which could be used to switch that interface type. Accordingly, the discussion above of implementations in which similar acts could be used to access different interfaces should be understood as being illustrative only, and should not be treated as limiting on the scope of protection provided by this or any related document.

Just as it is possible that the disclosed technology could be implemented to allow an interface as illustrated in FIG. 10 to be accessed in a manner similar to that discussed previously for the interfaces of FIGS. 8 and 9, it is also possible that the disclosed technology could be implemented to allow an interface such as illustrated in FIG. 10 to be customized using business rules in a manner similar to that described for the interfaces of FIGS. 8 and 9. For example, regardless of the types of self-scheduling interfaces provided (or even whether those interfaces are provided at all), in the disclosed technology, business rules could be used to balance user-centric (e.g., the user's skills, proficiency and part time versus full time work status) and/or activity centric (e.g., whether certain amounts of certain types of alternative assignments, such as training, are necessary for each user) and/or other parameters (e.g., time based parameters such as how far in the future a slot for an alternative assignment takes place) in determining whether a particular alternative activity should be identified in an interface such as shown in FIG. 10 as "available" for a particular user and slot. Thus, in a system implementing the disclosed technology which is configured to indicate that an alternative activity is available for a particular slot if a value representing the staffing level for that slot for the user's current assignment is greater than an availability threshold for the alternative activity for that same slot, business rules could be used to customize those values, so that the interface presented to a user who wishes to modify his or her schedule is at once specific to the user and appropriate in light of the then available business information.

To illustrate how this type of customization might take place, consider how the thresholds used to determine the availability of an alternative assignment could be modified based on the priority of that assignment. For example, if the alternative assignment is to perform some type of proficiency training, the availability threshold for that alternative assignment could be customized based on a priority determined for the user based on his or her measured proficiency. For instance, there could be a business rule which would state that users with a measured average handle time (AHT) value of over 100 seconds should be given AHT training with high priority (which would translate into a relatively low availability threshold), while users with a measured AHT value of less than 100 seconds should have AHT training treated as a low priority (which would translate into a relatively high availability threshold). As another example, if the alternative assignment is to perform some type of skills training, the availability threshold for that alternative assignment could be customized based on the priority determined for the user based on the skills required by the work he or she would perform. For instance, there could be a business rule stating that all users who handle credit card transactions should have payment card industry (PCI) compliance training treated as a high priority if they have not had PCI compliance training within three months, but as a low priority otherwise. As yet another example, if the alternative assignment is to perform training which can be provided through multiple channels, different availability thresholds could be set for those different channels using priorities based on factors such as their cost and capacity. For example, there could be a business rule stating that classroom training should be treated as a high priority for all users for whom it is potentially applicable until the class is full, after which point it should be treated as unavailable (thereby ensuring that a class is filled, but not oversubscribed), while a similar online training might be treated as medium priority regardless of how many users had signed up for it.

Of course, modification of availability thresholds is not limited to priority based customization such as described above, and other types of customization, such as time based customization, are also possible. For example, thresholds could be set based on the length of time required to complete an alternate assignment, with the availability threshold for an assignment generally increasing with the assignment's length. For instance, there may be a set of business rules that would specify that a two hour training module should be listed as an available alternative assignment only if there is a projected overstaffing (e.g., calculated as the projected supply of services during a particular time period divided by the projected demand for services during that same time period, less 100%) of 1% during each 15 minute interval during the training module, and/or a 5% or greater average overstaffing across all 15 minute intervals during the training module, while a ten minute training module could be shown as available provided that the period during which it would take place had a projected staff occupancy (e.g., calculated as the projected supply of services divided by the projected demand for those services) of 95% or greater.

As another example of a time based customization, a threshold could be set based on how far in the future the corresponding assignment would take place, with the threshold generally being lower the farther in advance an assignment is requested. For instance, there might be a set of business rules stating that, for slots happening more than 20 days in the future relative to the time when a request for a schedule change interface is requested, the availability threshold for those slots should be set at a staff occupancy of 80%, while the availability threshold for other slots taking place less than 48 hours after the request for the schedule change interface should be set at a staff occupancy of 105%.

As yet another example of a time based customization, some implementations of the disclosed technology could allow requirements to be set for alternative assignments to be completed within certain time periods, with the thresholds for those assignments set based on how much time remained in those periods. For instance, there could be business rules stating that staff members need to complete a minimum of four hours of training (or to complete certain specified training modules) each month, and a minimum of 20 hours of training per quarter, but could only have a maximum of 100 hours of training per year. In that instance, a system using the disclosed technology could be configured to implement those business rules by modifying the availability thresholds for that training to decrease as the end of a relevant period approached without all required training being completed, and to increase as the hours of training scheduled in a year approached the set yearly maximum.

Yet another example of a time based customization is a customization based where in a work cycle a particular alternative assignment would take place. For instance, there could be a set of business rules which would state that, for weekday mornings between 8:00 am and 11:00 am, alternative assignments falling within the broad category of training should have an availability threshold set at overstaffing of 5% or greater, while, for weekends, the thresholds for those alternative assignments should be set at a staff occupancy of 90%.

Other types of customizations are also possible, as are combinations of multiple customization types. As an example of another type of customization, it is possible that availability thresholds could be set based on user attributes, such as would be the case in a system where a business rule was set up which required that more training be provided for junior employees than senior employees (which could be implemented by setting the availability threshold for training at a minimum value when an employee is newly hired, then increasing it as he or she gains experience). As an example of a combination of multiple customization types, user attribute based customization could be combined with time based customization by, for example, varying the requirements for completing alternative assignments during particular time periods based on the attributes of a user who would be performing those alternative assignments (e.g., the example of a business rule requiring completion of four hours of training a month, twenty hours a quarter, and no more than 100 hours a year could be a default, with different (and likely lower) minimums and maximums being set for more proficient or senior staff members or for staff members who had part time rather than full time work status). More than two types of customization can also be combined. For example, customization based on priorities could be combined with customization based on temporal factors by and customization based on user attributes by, for example, when a user is detected as having an average handle time of 100 seconds or greater, starting a 30 day period during which that user would be required to complete the AHT training, with the priority of that training increasing as the end of the 30 day period approached (e.g., from high to urgent to immediate). Similarly, it is possible that an arbitrary number of different customizations could be combined by, for example, determining the availability threshold for an alternative assignment by initially setting that threshold at a default value, then increasing it or decreasing it based on any business rules which may be in place for that assignment, slot and user for which the availability is being determined.

Approaches to customization beyond modifying the values of availability thresholds are also possible. For example, instead of increasing a threshold, in some implementations, an alternative assignment could simply be designated as being unconditionally unavailable in appropriate circumstances. For instance, in some implementations, a policy requiring all staff members to complete code of conduct training each year could be implemented by means of a business rule stating that the alternative assignment of code of conduct training should be given a default availability threshold for all staff members except that it would be treated as unconditionally unavailable for any staff member who had completed that alternative assignment during the then current calendar year. Similarly, instead of setting a low threshold, an alternative assignment could simply be designated as mandatory and required to be added to a staff member's schedule. For example, a business rule could be set up requiring that a training module (e.g., a module related to compliance with some regulatory or contractual obligation) be completed by a certain date or over a certain timeframe, with the module given a default threshold but being automatically added to the schedules of staff members who did not add it by the relevant deadline.

Of course, while the examples of customization described above focused generally on modification of availability thresholds, the disclosed technology could be implemented in a manner which would allow customizations which are unrelated to such modification. For example, rather than simply designating an alternative assignment as "available" if it has an availability threshold less than the staffing level for the slot in which it would be performed, business rules setting other types of limits could also be applied. For instance, a system implementing the disclosed technology could be configured to only indicate that an alternative assignment is "available" if its availability threshold is below the relevant staffing level AND allowing it to be performed instead of a staff member's normal work assignment would not result in that staff member spending less than a threshold number of hours on his or her normal work assignment during a set time period (e.g., requiring no less than 30 hours/week to be devoted to a staff member's normal work assignments). Similarly, customizations could also be made through the staffing levels which would be compared to the availability thresholds, for example, by using different supply and demand projections depending on a staff member's skills (e.g., different supply and demand projections for agents who would provide support to Spanish speaking callers than for agents who would provide support to English speaking callers) and the time those skills would be needed.

It is also possible that an interface such as shown in FIG. 10 could be personalized in a manner which is not directly related to the determination of whether an alternative assignment will be identified as "available." For example, in a case where there is a policy that a user is required to complete a certain type of training within a certain time period, the interface presented to him or her could, instead of (or in addition to), manipulating the availability threshold for that training, include a message for the user informing him or her of that requirement. Other types of personalization are also possible, and the specific personalization which will be included in any particular case will vary depending on the relevant policies and requirements for that case (e.g., personalization in the form of manipulating thresholds for PCI compliance training would likely be omitted in a case where staff members would not process credit card transactions, personalization based on whether a staff member speaks multiple languages would likely be omitted in the case of a call center which provides second line support to English speaking callers, etc).

Of course, it should be understood that, while the examples of alternative assignments set forth above in the discussion focused on training, the disclosed techniques are not limited to being applied in that context. For example, the same techniques could be used to allow a user to add other types of alternative assignments to his or her schedule. For instance, at a company with a policy requiring certain staff members (or classes of staff members) to spend at least a certain amount of time doing tasks that would normally be assigned to others (e.g., a policy requiring managers to spend at least 10 hours/week on tasks normally assigned to entry level employees), the disclosed technology could be used to allow scheduling of those tasks in the same manner described above for scheduling training. Similarly, the techniques described above could be applied in the context of switching between scheduled and unscheduled time, or between unscheduled time and alternative assignments. For instance, an employer who required staff members to work 160 hours per month, with four of those hours devoted to training, could implement that using the above techniques by scheduling 160 hours per month (e.g., using a traditional workforce management system) then requiring staff members to replace 4 of the 16 scheduled hours with training using an interface such as shown in FIG. 10, or could schedule only 156 hours then require staff members to schedule the four hours of training during time which was not scheduled for them.

Additionally, just as the discussion above focused on switching between normal and alternative assignments, it is possible that similar techniques could be used to change between scheduled and unscheduled time, or between scheduled time and alternative assignments. For example, whether a request to switch a slot from a scheduled to an unscheduled slot (or vice versa) could use the same types of business rules and staffing level and availability threshold comparisons described in the context of switching to alternative assignments, though the availability thresholds for changing a slot from scheduled to unscheduled would likely be higher than those for changing a slot from a normal assignment to an alternative assignment.

Similarly, just as the same techniques could be used to determine whether different types of change requests would be automatically accepted, it is also possible that the same interfaces could be used to allow those change requests to be made. For example, the disclosed technology could be used to implement a system configured to present a schedule change interface which would include a plurality of slots and a color coded list of statuses those slots might have (e.g., scheduled for performance of a staff member's normal duties, not scheduled for performance of any task, scheduled for performance of an alternative assignment and/or scheduled for a particular alternative assignment, etc), and which would use the colors from that list to indicate both the current status of the slots (e.g., by, for each slot, using the color corresponding to the status of that slot for the staff member who requested the interface as that slot's background color) and what status change requests would be automatically accepted (e.g., by, for each slot, for each new status that slot could be automatically modified to have, including a circle of the color corresponding to that new status in that slot). Such an interface could then allow a user to make a change request by indicating what new statuses he or she would like the displayed slots to have (e.g., by touching colored circle(s) corresponding the new status(es) he or she would like in the slot(s) he or she would like to change, etc).

Of course, while it is possible that implementations of the disclosed technology could allow a single interface to be used for multiple types of change requests, including such an interface is not a requirement for implementing the disclosed technology. For example, it is possible that the disclosed technology could be used to implement a system which in which staff members would be able to make multiple different types of change requests (e.g., changing slots between being scheduled and unscheduled, changing from normal to alternative assignments), but would have to use different interfaces for each type of request (e.g., one interface for changing slots between being scheduled and unscheduled, one interface for changing slots between normal and alternative assignments). Indeed, the organization and capabilities of interfaces presented to users could vary from implementation to implementation (e.g., some implementations could have an interface dedicated to particular types of alternative assignments, such as an interface which could be used to submit requests for training, an interface dedicated to particular subgroups of alternative assignments, such as those for training which would be provided online versus training which would be provided in a classroom, etc), with the precise details of any interface preferably being modified to suit the context in which it was used. Accordingly, the discussion above regarding interfaces which could be used for submitting various types of schedule change requests should be understood as being illustrative only, and should not be treated as limiting.

Further, just as the preceding discussion of switching between normal and alternative assignments focused on determining whether an alternative assignment should be identified as available so that a user could know he or she could automatically add it to his or her schedule, it is possible that the disclosed technology could be used to implement other approaches to adding alternative assignments, including approaches which could require some level of manual review and/or approval. For example, in some implementations, there could rules setting multiple availability thresholds, with changes in slots with staffing levels meeting or exceeding the most stringent threshold being accepted automatically, and changes in slots with staffing levels which do not exceed the most stringent requiring some level of approval before they could be made. For instance, availability thresholds for an assignment could be set so that a request to add that assignment would be automatically accepted (and the assignment would be identified as "available") if the request was made for a slot which was overstaffed by 5% or more, would be referred to a manager for approval if it was made for a slot which was overstaffed by less than 5% but more than 0%, and would be automatically denied if the request was made for a slot had 0% or less overstaffing. Similar results could also be achieved without requiring multiple thresholds. To illustrate, consider a company with a policy that staff members could request no more than a set amount of training per month. Such a company could implement that policy with business rules stating that training assignments should not be listed as available for any staff member in a month where he or she had already reached or exceeded his or her training hour limit. However, such a company could also have a subsidiary rule stating that training assignments should be displayed as potentially available even for staff members who had met or exceeded their monthly training hour limit, but that if a training assignment was requested by one of those staff members, the request would have to be approved by a manager before it could be added to the staff member's schedule.

Additional variations not explicitly described herein will be immediately apparent to, and could be implemented by those of ordinary skill in the art in light of, this disclosure. Accordingly, instead of limiting the protection accorded by this document, or by any document which is related to this document, to the material explicitly disclosed herein, the protection should be understood to be defined by the following claims, which are drafted to reflect the scope of protection sought by the inventors in this document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to the claims based on the above disclosure or the incorporated priority documents is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

Explicit Definitions

When used in the claims, a statement that something is "based on" something else should be understood to mean that something is determined at least in part by the thing that it is indicated as being "based on." When something is completely determined by a thing, it will be described as being "based EXCLUSIVELY on" the thing.

When used in the claims, "cardinality" should be understood to refer to the number of elements in a set.

When used in the claims, "computer" should be understood to refer to a device, or group of devices, which is capable of performing one or more logical and/or physical operations on data to produce a result. Non-limiting examples of "computers" include servers, laptops, desktops, netbooks, and notebooks, as well as handheld devices such as cellular phones, personal digital assistants, and portable game consoles.

When used in the claims, "computer executable instructions" should be understood to refer to data which can be used to specify physical or logical operations which can be performed by a computer.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Computer memory such as hard discs, read only memory, random access memory, solid state memory elements, optical discs and registers is an example of a "computer readable medium."

When used in the claims, "configured" should be understood to mean that the thing "configured" is adapted, designed or modified for a specific purpose. An example of "configuring" in the context of computers is to provide a computer with specific data (which may include instructions) which can be used in performing the specific acts the computer is being "configured" to do. For example, installing Microsoft WORD on a computer "configures" that computer to function as a word processor, which it does by using the instructions for Microsoft WORD in combination with other inputs, such as an operating system, and various peripherals (e.g., a keyboard, monitor, etc).

When used in the claims, "database" should be understood be to a collection of data stored on a computer readable medium in a manner such that the data can be retrieved by a computer. The term "database" can also be used to refer to the computer readable medium itself (e.g., a physical object which stores the data).

When used in the claims, the verb "display" refers to the act of providing the thing "displayed" in a visually perceptible form. It should be understood that, in the context of this disclosure, "displaying" refers not only to actually physically presenting a thing on a screen, but also to causing that thing to be presented (e.g., by sending instructions from a local CPU, or by sending information over a network which causes a thing to be "displayed").

When used in the claims, an "element" of a "set" (defined infra) should be understood to refer to one of the things in the "set."

When used in the claims, "means for allowing a staff member to use the staff member computing device to identify and submit schedule modification requests which will be automatically accepted" should be understood as a means+function limitation as provided for in 35 U.S.C. §112(f), in which the function is "allowing a staff member to use the staff member computing device to identify and submit schedule modification requests which will be automatically accepted" and the corresponding structure is a computer configured to perform one or more of the algorithms described in paragraphs 28-54 to determine the content of schedule modification interfaces such as illustrated in FIGS. 8-10.

When used in the claims, "for performing the function of allowing the staff member to use the staff member computing device to identify and submit schedule modification requests which will be automatically accepted by performing acts comprising identifying training activities and corresponding slots to include in a schedule modification interface using time based customization" should be understood as a means+function limitation as provided for in 35 U.S.C. §112(f) in which the function is "performing the function of allowing the staff member to use the staff member computing device to identify and submit schedule modification requests which will be automatically accepted by performing acts comprising identifying training activities and corresponding slots to include in a schedule modification interface using time based customization" and the corresponding structure is a computer configured to perform one or more of the time based customizations discussed in the context of scheduling training activities to determine the content of a schedule modification interface.

When used in the claims, "for performing the function of allowing the staff member to use the staff member computing device to identify and submit schedule modification requests which will be automatically accepted by performing acts comprising identifying training activities and corresponding slots to include in a schedule modification interface using priority based customization" should be understood as a means+function limitation as provided for in 35 U.S.C. §112 (f) in which the function is "performing the function of allowing the staff member to use the staff member computing device to identify and submit schedule modification requests which will be automatically accepted by performing acts comprising identifying training activities and corresponding slots to include in a schedule modification interface using priority based customization" and the corresponding structure is a computer configured to perform one or more of the priority based customizations discussed in the context of scheduling training activities to determine the content of a schedule modification interface.

When used in the claims, "remote" should be understood to refer to the relationship between entities which are physically distant from one another, such as between entities that communicate over a network.

When used in the claims, "projection of demand for work" means a quantity of labor expected to be needed at a future time.

When used in the claims, the term "set" should be understood to refer to a number, group, or combination of zero or more things of similar nature, design, or function.

When used in the claims, "staffing level projection" should be understood to refer to a relationship between expected supply demand for labor at a future time. Examples of "staffing level projections" include overstaffing projections and occupancy projections. It should be understood that a "staffing level projection" may be tailored for particular types of labor. For example, even during a single future time period, a "staffing level projection" for agents who would provide Spanish language technical support to incoming callers would likely be different than the "staffing level projection" for agents who would provide English language technical support to incoming callers.

When used in the claims, the term "storing" used in the context of a memory or computer readable medium should be understood to mean that the thing "stored" is reflected in one or more physical properties (e.g., magnetic moment, electric potential, optical reflectivity, etc) of the thing doing the "storing" for a period of time, however brief.

When used in the claims, "workforce management system" should be understood to refer to a system used to manage the scheduling or activities of agents. An example of a system which would be treated as a "workforce management system" as that phrase is used in the claims is an automatic call distribution system.

Accordingly, we claim:

1. A method for allowing staff members to submit schedule modification requests using a schedule modification interface which indicates requests which would be automatically accepted, wherein the method is performed for a staff member after a schedule for the staff member is generated, the schedule for the staff member comprising a time span covering a plurality of future time periods, being generated based on demand information from a workforce management system comprising, for each future time period from the plurality of future time periods, a projection of demand for work by the staff member during that future time period, and the plurality of future time periods comprising a set of scheduled time periods during which the staff member is contractually obligated to perform tasks for an employer, the method comprising a set of tasks performed by a computer, the set of tasks comprising:

a) after the schedule is generated and after a schedule modification interface request is received from a remote computing device associated with the staff member, the computer identifying one or more selectable activities for the staff member, wherein:
      i) for each of the identified one or more selectable activities there is a set of one or more available time periods during which that selectable activity is available for the staff member; and
      ii) the computer identifies the one or more selectable activities by performing acts comprising:
         A) determining which rules from a set of rules specified by the employer for evaluating potential schedule changes should be applied to evaluate contemporaneous schedule modification requests from the staff member; and
         B) applying the rules determined for evaluating contemporaneous schedule modification requests from the staff member with information corresponding to parameters specified in the rules using a rules engine;
   b) generating, in response to the schedule modification interface request, a set of data operable to configure the remote computing device associated with the staff member to present the schedule modification interface, wherein the schedule modification interface:
      i) comprises a grid comprising slots corresponding to two or more periods from the plurality of future time periods;
      ii) indicates:
         A) for each period from the two or more periods having corresponding slots in the grid, whether that period is comprised by the set of scheduled time periods;
         B) each of the identified one or more selectable activities having an available time period comprised by the two or more periods having corresponding slots in the grid and no other selectable activities;
      iii) is operable by the staff member to generate a schedule change request based on manipulation of one or more slots comprised by the grid;
   c) receiving, via the schedule modification interface, the schedule change request, wherein the schedule change request requests that a selectable activity from the identified one or more selectable activities be added to the schedule for the staff member during a time period from the set of available time periods for that selectable activity;

d) based on receiving the schedule change request and by executing a set of instructions stored in a memory using a processor:
   i) automatically adding, to the schedule for the staff member, the selectable activity requested in the schedule change request during the time period requested for that selectable activity in the schedule change request; and
   ii) updating staff data used by the workforce management system to create staffing level projections to include the staff member to whose schedule the selectable activity requested in the schedule change request is automatically added performing the selectable activity during the period requested for the selectable activity in the schedule change request;
wherein the computer is configured with instructions operable to cause it to, between receiving the schedule modification interface request and the schedule change request:
   A) obtain updated information corresponding to parameters in the rules specified by the employer for evaluating potential schedule changes;
   B) repeat the step of identifying one or more selectable activities for the staff member using the then most recent information corresponding to the parameters in the rules specified by the employer for evaluating potential schedule changes; and
   C) selectively, based on concurrency controls and the then most recent information corresponding to the parameters in the rules specified by the employer for evaluating potential schedule changes, send interface update data to the remote computing device associated with the staff member, the interface update data operable to update the schedule modification interface to indicate the one or more selectable activities most recently identified by the computer.

2. The method of claim 1, wherein:
a) the time period requested for the selectable activity in the schedule change request is comprised by the set of scheduled time periods during which the staff member is contractually obligated to perform tasks for the employer;
b) the selectable activity requested in the schedule change request is having time off; and
c) adding the selectable activity requested in the schedule change request during the time period requested for that selectable activity in the schedule change request comprises canceling the staff member's contractual obligation to perform tasks for the employer during the time period requested for the selectable activity of having time off in the schedule change request.

3. The method of claim 1, wherein:
a) each of the identified one or more selectable activities is a training activity;
b) the time period requested for the selectable activity in the schedule change request is comprised by the set of scheduled time periods during which the staff member is contractually obligated to perform tasks for the employer;
c) adding the selectable activity requested in the schedule change request during the time period requested for that selectable activity in the schedule change request comprises changing the tasks the staff member is contractually obligated to perform during the time period requested for the training activity in the schedule change request to the training activity requested in the schedule change request.

4. The method of claim 1, wherein:
a) each of the identified one or more selectable activities is a training activity; and
b) the method comprises determining an availability threshold for a first selectable activity during a first time period from the plurality of future time periods based on a temporal attribute, wherein the temporal attribute is:
   a) a number of required training hours required for the staff member over a time span comprising the first time period;
   b) recurring work hour needs for the first time period;
   c) duration of the first selectable activity; or
   d) amount of time separating:
      i) receipt of the schedule modification interface request from the staff member; from
      ii) the first time period.

5. The method of claim 4, wherein:
a) the temporal attribute is recurring work hour needs for the first time period;
b) the determination of the availability threshold for the first selectable activity during the first time period is made using computer readable data operable to configure a computer to:
   i) set the availability threshold at a first staffing level if the first time period is on a weekday morning; and
   ii) set the availability threshold at a second staffing level if the first time period is on a weekend.

6. The method of claim 4, wherein:
a) the temporal attribute is duration of the first selectable activity;
b) the method comprises determining whether to include the first selectable activity in the identified set of one or more selectable activities using computer readable data operable to configure a computer to:
   i) if the first selectable activity has a duration greater than a threshold duration, wherein the threshold duration is a duration of a time period from the plurality of future time periods, include the first selectable activity in the identified set of one or more selectable activities if there exists a set of consecutive time periods from the set of future time periods for which each of the following is true:
      A) the set of consecutive time periods has a duration greater than the duration of the first selectable activity;
      B) for each of a set of sub-period intervals covered by the set of consecutive time periods, that sub-period interval has a most recent staffing level projection greater than a first availability threshold; and
      C) an average of the most recent staffing level projections for sub-period intervals from the set of sub-period intervals covered by the set of consecutive time periods is greater than a second availability threshold;
   and
   ii) if the selectable activity has a duration less than the threshold duration, include the first selectable activity in the identified set of one or more selectable activities if there exists a time period from the set of future time periods which comprises a sub-period interval having:
      A) a duration equal to the duration of the selectable activity; and
      B) a most recent staffing level projection greater than a third availability threshold;
c) the first availability threshold is less than the second availability threshold;

d) exceeding the first availability threshold requires a greater supply of work than demand for work;
e) exceeding the third availability threshold does not require a greater supply of work than demand for work; and
f) if the first selectable activity has a duration greater than the threshold duration, automatically adding the selectable activity requested in the schedule change request to the schedule for the staff member comprises adding the first selectable activity to a plurality of consecutive time periods.

7. The method of claim 1, wherein:
a) each of the identified one or more selectable activities is a training activity;
b) identifying the one or more selectable activities is based on:
   i) training activities performed by the staff member during a month which includes the plurality of future time periods relative to a minimum training activity requirement for that month;
   ii) training activities performed by the staff member during a quarter which includes the plurality of future time periods relative to a minimum training activity requirement for that quarter; and
   iii) training activities performed the staff member during a year which includes the plurality of future time periods relative to a maximum training activity limit for that year; and
c) the minimum training activity requirement for the quarter which includes the plurality of future time periods is more than three times larger than the minimum training activity requirement for the month which includes the plurality of future time periods.

8. The method of claim 1, wherein:
a) each of the identified one or more selectable activities is a training activity;
b) the method comprises determining whether the schedule modification interface should identify a first activity as a selectable activity which can be added to the schedule for the staff member during a first time period using computer readable data operable to configure the back end computer to:
   i) if the first selectable activity is a classroom training activity having a maximum number of potential participants:
      A) if, when the schedule modification interface request is received from the staff member, a number of staff members no less than the maximum number of potential participants is assigned to perform the first selectable activity during the first time period, determine that the schedule modification interface should not identify the first activity as a selectable activity which can be added to the schedule for the staff member during the first time period;
      B) if, when the schedule modification interface request is received from the staff member, a number of staff members less than the maximum number of potential participants is assigned to perform the first selectable activity during the first time period, determine that a first availability threshold should be used in a comparison with a most recent staffing level projection for the first time period in determining whether the schedule modification interface should identify the first activity as a selectable activity which can be added to the schedule for the staff member during the first time period;
   ii) if the first selectable activity is an online training activity not having a maximum number of potential participants, determine that a second availability threshold should be used in a comparison with the most recent staffing level projection for the first time period in determining whether the schedule modification interface should identify the first activity as a selectable activity which can be added to the schedule for the staff member during the first time period; and
c) the first availability threshold is less than the second availability threshold.

9. A system for allowing, after generation for a staff member of a schedule comprising a time span covering a plurality of future time periods comprising a set of scheduled time periods during which the staff member is contractually obligated to perform tasks for an employer based on, for each future time period from the plurality of future time periods, a projection of demand for work by the staff member during that future time period, submission of schedule modification requests, the system comprising:
a) a staff member computing device; and
b) a computer located remotely from the staff member computing device, wherein the computer is configured to perform a set of acts comprising:
   i) after the schedule is generated and after a schedule modification interface request is received from the staff member computing device, identifying one or more selectable activities for the staff member, wherein:
      A) for each of the identified one or more selectable activities there is a set of one or more available time periods during which that selectable activity is available for the staff member; and
      B) the computer identifies the one or more selectable activities by performing acts comprising:
         I) determining which rules from a set of rules specified by the employer for evaluating potential schedule changes should be applied to evaluate contemporaneous schedule modification requests from the staff member; and
         II) applying the rules determined for evaluating contemporaneous schedule modification requests from the staff member with the information corresponding to parameters specified in the rules using a rules engine;
   ii) generating, in response to the schedule modification interface request, a set of data operable to configure the staff member computing device associated to present a schedule modification interface, wherein the schedule modification interface:
      A) comprises a grid comprising slots corresponding to two or more periods from the plurality of future time periods;
      B) indicates:
         I) for each period from the two or more periods having corresponding slots in the grid, whether that period is comprised by the set of scheduled time periods;
         II) each of the identified one or more selectable activities having an available time period comprised by the two or more periods having corresponding slots in the grid and no other selectable activities;
      C) is operable by the staff member to generate a schedule change request based on manipulation of one or more slots comprised by the grid;

iii) receiving, via the schedule modification interface, the schedule change request, wherein the schedule change request requests that a selectable activity from the identified one or more selectable activities be added to the schedule for the staff member during a time period from the set of available time periods for that selectable activity;

iv) based on receiving the schedule change request:

A) automatically adding, to the schedule for the staff member, the selectable activity requested in the schedule change request during the time period requested for that selectable activity in the schedule change request; and B) updating staff data used by the workforce management system to create staffing level projections to include the staff member to whose schedule the selectable activity requested in the schedule change request is automatically added performing the selectable activity during the period requested for the selectable activity in the schedule change request;

wherein the computer is configured with instructions operable to cause it to, between receiving the schedule modification interface request and the schedule change request:

I) obtain updated information corresponding to parameters in the rules specified by the employer for evaluating potential schedule changes;

II) repeat the step of identifying one or more selectable activities for the staff member using the then most recent information corresponding to the parameters in the rules specified by the employer for evaluating potential schedule changes; and III) selectively, based on concurrency controls and the then most recent information corresponding to the parameters in the rules specified by the employer for evaluating potential schedule changes, sending interface update data to the remote computing device associated with the staff member, the interface update data operable to update the schedule modification interface to indicate the one or more selectable activities most recently identified by the computer.

10. The system of claim 9, wherein:
a) each of the identified one or more selectable activities is a training activity;
b) the computer is configured to, when the time period requested for the selectable activity in the schedule change request is comprised by the set of scheduled time periods during which the staff member is contractually obligated to perform tasks for the employer, perform the act of adding the selectable activity requested in the schedule change request by changing the tasks the staff member is contractually obligated to perform during the time period requested for the training activity in the schedule change request to the training activity requested in the schedule change request.

11. The system of claim 9, wherein:
a) each of the identified one or more selectable activities is a training activity; and
b) the set of acts the computer is configured to perform comprises determining an availability threshold for a first selectable activity during a first time period from the plurality of future time periods based on a temporal attribute, wherein the temporal attribute is:

a) a number of required training hours required for the staff member over a time span comprising the first time period;
b) recurring work hour needs for the first time period;
c) duration of the first selectable activity; or
d) amount of time separating:
  i) receipt of the schedule modification interface request from the staff member; from
  ii) the first time period.

12. The system of claim 11, wherein:
a) the temporal attribute is recurring work hour needs for the first time period;
b) the computer is configured to make the determination of the availability threshold for the first selectable activity during the first time period using computer readable data operable to configure the computer to:
  i) set the availability threshold at a first staffing level if the first time period is on a weekday morning; and
  ii) set the availability threshold at a second staffing level if the first time period is on a weekend.

13. The method of claim 11, wherein:
a) the temporal attribute is duration of the first selectable activity;
b) the set of acts the computer is configured to perform comprises determining whether to include the first selectable activity in the identified set of one or more selectable activities using computer readable data operable to configure the computer to:
  i) if the first selectable activity has a duration greater than a threshold duration, wherein the threshold duration is a duration of a time period from the plurality of future time periods, include the first selectable activity in the identified set of one or more selectable activities if there exists a set of consecutive time periods from the set of future time periods for which each of the following is true:
    A) the set of consecutive time periods has a duration greater than the duration of the first selectable activity;
    B) for each of a set of sub-period intervals covered by the set of consecutive time periods, that sub-period interval has a most recent staffing level projection greater than a first availability threshold; and
    C) an average of the most recent staffing level projections for sub-period intervals from the set of sub-period intervals covered by the set of consecutive time periods is greater than a second availability threshold;
  and
  ii) if the selectable activity has a duration less than the threshold duration, include the first selectable activity in the identified set of one or more selectable activities if there exists a time period from the set of future time periods which comprises a sub-period interval having:
    A) a duration equal to the duration of the selectable activity; and
    B) a most recent staffing level projection greater than a third availability threshold;
c) the first availability threshold is less than the second availability threshold;
d) exceeding the first availability threshold requires a greater supply of work than demand for work;
e) exceeding the third availability threshold does not require a greater supply of work than demand for work; and f) the computer is configured to, if the first selectable activity has a duration greater than the threshold duration, perform the act of automatically adding the selectable activity requested in the schedule change request to the schedule for the staff member by adding the first selectable activity to a plurality of consecutive time periods.

14. The system of claim 9, wherein:
   a) each of the identified one or more selectable activities is a training activity;
   b) the set of acts the computer is configured to perform comprises identifying the one or more selectable activities based on:
      i) training activities performed by the staff member during a month which includes the plurality of future time periods relative to a minimum training activity requirement for that month;
      ii) training activities performed by the staff member during a quarter which includes the plurality of future time periods relative to a minimum training activity requirement for that quarter; and
      iii) training activities performed the staff member during a year which includes the plurality of future time periods relative to a maximum training activity limit for that year;
   and
   c) the minimum training activity requirement for the quarter which includes the plurality of future time periods is more than three times larger than the minimum training activity requirement for the month which includes the plurality of future time periods.

15. The system of claim 9, wherein:
   a) each of the identified one or more selectable activities is a training activity;
   b) the set of acts the computer is configured to perform comprises determining whether the schedule modification interface should identify a first activity as a selectable activity which can be added to the schedule for the staff member during a first time period using computer readable data operable to configure the computer to:
      i) if the first selectable activity is a classroom training activity having a maximum number of potential participants:
         A) if, when the schedule modification interface request is received from the staff member, a number of staff members no less than the maximum number of potential participants is assigned to perform the first selectable activity during the first time period, determine that the schedule modification interface should not identify the first activity as a selectable activity which can be added to the schedule for the staff member during the first time period;
         B) if, when the schedule modification interface request is received from the staff member, a number of staff members less than the maximum number of potential participants is assigned to perform the first selectable activity during the first time period, determine that a first availability threshold should be used in a comparison with a most recent staffing level projection for the first time period in determining whether the schedule modification interface should identify the first activity as a selectable activity which can be added to the schedule for the staff member during the first time period;
      ii) if the first selectable activity is an online training activity not having a maximum number of potential participants, determine that a second availability threshold should be used in a comparison with the most recent staffing level projection for the first time period in determining whether the schedule modification interface should identify the first activity as a selectable activity which can be added to the schedule for the staff member during the first time period;
   and
   c) the first availability threshold is less than the second availability threshold.

* * * * *